(12) United States Patent
Melnyk et al.

(10) Patent No.: US 10,767,076 B2
(45) Date of Patent: Sep. 8, 2020

(54) WATER-REDUCIBLE COATING COMPOSITION

(71) Applicant: SWIMC LLC, Cleveland, OH (US)

(72) Inventors: Thomas J. Melnyk, Greenfield, MN (US); Michael A. Bauer, South St. Paul, MN (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 16/412,005

(22) Filed: May 14, 2019

(65) Prior Publication Data

US 2019/0270910 A1 Sep. 5, 2019

Related U.S. Application Data

(60) Division of application No. 15/216,979, filed on Jul. 22, 2016, now abandoned, which is a continuation of application No. PCT/US2015/012051, filed on Jan. 20, 2015.

(60) Provisional application No. 61/931,871, filed on Jan. 27, 2014.

(51) Int. Cl.
*C09D 5/08* (2006.01)
*C09D 167/08* (2006.01)

(52) U.S. Cl.
CPC ............ *C09D 167/08* (2013.01); *C09D 5/08* (2013.01)

(58) Field of Classification Search
CPC ................................ C09D 167/08; C09D 5/08
See application file for complete search history.

(56) References Cited

U.S. PATENT DOCUMENTS

| | | | |
|---|---|---|---|
| 4,133,786 A | 1/1979 | Harris et al. | |
| 4,517,322 A | 5/1985 | Birkmeyer et al. | |
| 5,252,615 A | 10/1993 | Rao et al. | |
| 5,371,112 A | 12/1994 | Sayre et al. | |
| 5,858,551 A * | 1/1999 | Salsman | C04B 41/009 428/357 |
| 6,762,230 B2 | 7/2004 | Brandenburger et al. | |
| 6,946,509 B2 | 9/2005 | He | |
| 7,812,079 B2 | 10/2010 | Brandenburger et al. | |
| 8,637,581 B2 | 1/2014 | Moens | |
| 8,895,689 B2 | 11/2014 | Melnyk et al. | |
| 8,940,090 B2 | 1/2015 | Lemke et al. | |
| 2008/0275192 A1 * | 11/2008 | Melnyk | C08G 63/48 525/418 |

FOREIGN PATENT DOCUMENTS

| | | |
|---|---|---|
| CN | 101585910 | 11/2008 |
| CN | 101384640 A | 3/2009 |
| EP | 0556592 | 8/1993 |
| EP | 0558906 | 8/1993 |
| JP | S54-131694 | 10/1979 |
| JP | 2002128880 | 5/2002 |
| JP | 2002317035 | 10/2002 |
| WO | 2007/087175 A2 | 8/2007 |
| WO | 2008/103289 A1 | 8/2008 |
| WO | 2012/074617 A2 | 6/2012 |

OTHER PUBLICATIONS

International Search Report and Written Opinion for international application No. PCT/US2012/012051, dated May 12, 2015 (9 pages).
Atta, Ayman M. et al., "Corrosion Protective Coating Based on Alkyd Resins Derived from Recycled Poly (ethylene terephthalate) Waste for Carbon Steel," International Journal of Electrochemical Science, Published Apr. 1, 2013, pp. 5136-5152.
"Polymer Materials," 2nd edition, Li Huang, Chemical Industrial Press, Feb. 28, 2010, p. 221.
"Waste Plastic Recycling and Practical Technology," Guiliang Qi, Mechanical Industrial Press, Oct. 31, 2011, pp. 262-265.
J. Dullius et al., "Chemical recycling of post-consumer PET: Alkyd resins synthesis," Progress in Organic Coatings, vol. 57 (2006), P. 123-127.
Cardeño, et al., "Sintesis de Resinas Alquidicas a partir de Aceites de Higuerilla, de Palma y de Fritura, Mezclados con Aceite de Soja", 2013, Información Tecnológica, Universidad de Antioquia, Sede de Investigación Universitaria, Medellín, Columbia, 24(4):33-42. Translation provided for title and abstract only.
International Preliminary Report on Patentability for international application No. PCT/US2015/012051, dated Aug. 2, 2016, 6 pages.
International Search Report and Written Opinion for international application No. PCT/US2015/012051, dated May 12, 2015, 8 pages.
European Patent Application No. 15740672.9; European Extended Search Report dated Aug.7, 2017, 7 pages.
European Patent Application No. 15740672.9; European Communication under Article 94(3) EPC, dated Jul. 23, 2018, 5 pages.

* cited by examiner

*Primary Examiner* — Kara B Boyle

(57) ABSTRACT

The present description provides a water-reducible or water-dispersible coating system that can be used to form a durable, corrosion-resistant protective coating on a wide range of substrates. The coating system includes an alkyd resin prepared from a polyester feedstock that includes post-consumer recycled PET and a waste cooking oil feedstock. Methods for preparing the coating system and articles coated with the coating system are also described.

12 Claims, No Drawings

WATER-REDUCIBLE COATING COMPOSITION

CROSS-REFERENCE TO RELATED APPLICATION(S)

This application is a divisional application of U.S. application Ser. No. 15/216,979, filed 22 Jul. 2016, which is a continuation of International Application Ser. No. PCT/US2015/012051, filed 20 Jan. 2015, which claims priority from U.S. Provisional Application Ser. No. 61/931,871, filed 27 Jan. 2014, each of which is incorporated herein by reference in its entirety.

BACKGROUND OF THE INVENTION

Alkyd resins are polyester resins derived from the reaction of polyols with dicarboxylic acids or anhydrides, and modified by fatty acids. Conventional methods for making alkyd resins use fatty acids derived from vegetable oils, tall oils, short oils, and the like. Although alkyd resins are typically solvent-based, environmental concerns over volatile organic compound (VOC) content in coating compositions has led to interest in water-reducible or water-dispersible alkyd resins.

Environmental concerns over increasing quantities of waste or post-consumer materials have created interest in coating compositions made from waste materials. For example, fast food restaurants generate large quantities of used vegetable oil or waste oil. The waste cooking oil can pose a pollution hazard and has the potential to clog waterways and drain systems during disposal. Therefore, used cooking oil, called yellow grease or brown grease, is typically trapped and filtered out of waste water streams and rendered into animal feed, biodiesel fuel and the like. In addition, waste cooking oil may be used as a fatty acid feedstock for producing alkyd resins, although these alkyd resins may lack the hardness, durability and early water resistance required of a water-reducible coating composition.

Other waste or post-consumer materials may also be used as feedstock for making alkyd resins. For example, polyethylene terephthalate is in widespread use, and recycling PET helps manage solid waste problems while conserving resources and energy. However, water-reducible resins with high PET content typically demonstrate poor water resistance and may not be useful in making corrosion-resistant coating compositions.

Therefore, in view of the foregoing, increasing environmental concerns may be met by new water-reducible or water-dispersible coatings derived from waste or post-consumer materials, where the coatings demonstrate optimal durability, water resistance and corrosion resistance.

SUMMARY OF THE INVENTION

In an embodiment, the present description provides a coating system including a water-reducible alkyd made by the reaction of a polyester feedstock and a waste cooking oil feedstock. In an aspect, the polyester feed stock includes at least one resin with a polyester backbone and makes up 60 to 75 wt % of the total composition. In an aspect, the waste cooking oil feedstock includes yellow grease, brown grease or a combination of yellow and brown grease and makes up 25 to 35 wt % of the total composition.

In another embodiment, the present description provides methods of making a water-reducible alkyd resin. The method includes steps of providing a polyester feedstock that includes at least polyethylene terephthalate derived from waste material, an aromatic or aliphatic acid and a polyol. A waste cooking oil feedstock is also provided, and the two are combined to produce a water-reducible alkyd resin.

A coated article, wherein the article includes a metal substrate where at least a portion of the exposed surface of the substrate has the coating composition applied thereon. Methods of applying the coating composition to a metal substrate are also provided.

DETAILED DESCRIPTION

Unless otherwise specified, the following terms as used herein have the meanings provided below.

The term "component" refers to any compound that includes a particular feature or structure. Examples of components include compounds, monomers, oligomers, polymers, and organic groups contained there.

The term "volatile organic compound" ("VOC") refers to any compound of carbon, excluding carbon monoxide, carbon dioxide, carbonic acid, metallic carbides or carbonates, and ammonium carbonate, which participates in atmospheric photochemical reactions. Typically, volatile organic compounds have a vapor pressure equal to or greater than 0.1 mm Hg. As used herein, "volatile organic compound content" ("VOC content") means the weight of VOC per volume of the coating solids, and is reported, for example, as grams (g) of VOC per liter (L).

As used herein, the term "low VOC" means that a composition contains no more than about 15 wt % VOC (equivalent to about 290 g/L VOC).

The term "water-dispersible" or "water-reducible" in the context of a water-dispersible polymer or water-reducible polymer means that the polymer can be mixed into, or diluted with, water (or an aqueous carrier) to form a stable mixture. For example, a mixture that separates into immiscible layers during storage or with the application of physical force is not a stable mixture. The terms "water-dispersible" and "water-reducible" are intended to include the term "water-soluble" and are used interchangeably herein. In other words, by definition, a water-soluble polymer is also considered to be a water-dispersible polymer or a water-reducible polymer.

The term "dispersion" in the context of a dispersible polymer refers to the mixture of a dispersible polymer and a carrier. As used herein, the term "dispersion" is intended to include the terms "solution" and "suspension."

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

The present invention generally includes a water-reducible coating system. The coating compositions described herein are useful to form durable, corrosion-resistant coatings over a wide range of metal substrates, including, for example, the underbody or undercarriage of various types of transportation equipment or vehicles. The coating system advantageously has excellent adhesion properties and can be directly coated on various surfaces, with or without an intervening or intermediate coating layer or system. Other types of coatings can be used in combination with the coating system of the present invention if desired. The coating system is particularly effective for protecting metal or metal-containing substrates. The resultant coatings are durable, corrosion-resistant and chip-resistant. Additionally, the coating compositions are environmentally friendly in that they are low VOC compositions and contain significant quantities of waste or post-consumer recycled material.

The advantages described herein are provided by a water-reducible coating system comprising an alkyd resin coating composition. Desirably, the alkyd resin is film forming on its own or can be caused to be film forming, such as in a formulation or paint in combination with coalescing aid(s), heat, one or more filler components, pigments, and/or the like. In an embodiment, the alkyd resin coating composition is derived from waste or recycled material and is present in an amount of about 10 to 30 wt %, preferably 15 to 25 wt % of a finished dry coating formed from the composition.

The coating system of the invention includes a coating composition that may be a single phase solution in which one or more ingredients including at least the alkyd resin component are substantially fully dissolved in a carrier. Alternatively, the coating composition may include two or more phases. Compositions including two or more phases may be in the form of dispersions such as a dispersion in which one or more phases are dispersed in a continuous phase of another material and/or phase. Many dispersions are in the form of suspensions including but not limited to colloidal suspensions. Conventionally, alkyd resins are prepared by the reaction of one or more dibasic acids, one or more polyols, and fatty acids derived or isolated from naturally occurring triglycerides in animal and vegetable oils. The resin is typically formed by a polycondensation reaction, and unsaturated groups provide additional reaction sites for condensation and crosslink formation, leading to increased hardness. However, alkyd resins made in this manner are not typically water-resistant or corrosion-protective. In addition, alkyd resins made in this manner are not usually water-reducible or water-soluble. Surprisingly, and contrary to the expectations of a person of skill in the art, the alkyd resin component described herein is water-reducible and has near-immediate water resistance on application to a metal substrate. By "near-immediate" is meant a film that is dry to the touch at about 10 minutes after application and ambient cure. Dry to the touch may not imply tack-dry or dry to the point where the film is no longer imprintable.

Accordingly, in an embodiment, the coating system described herein includes an alkyd resin component derived from the reaction of a feedstock containing at least one resin with a polyester backbone and a feedstock containing waste cooking oil. In an aspect, the alkyd resin is prepared using about 65 to 75 percent by weight of a polyester backbone-containing feedstock, and about 25 to 35 percent by weight of a waste cooking oil feedstock, based on the total weight of the composition.

The amount of the alkyd resin component in the coating system described herein may be selected from a wide range. Generally, if the amount of alkyd resin is too low, it may be difficult to form a film that has sufficient adhesion to the substrate, or the film may have insufficient corrosion resistance or other performance, and/or the like. If too much alkyd resin is used, it may be harder to formulate an effective coating system or it may be more difficult to make a coating that can be applied to the substrate. Balancing such concerns, the coating system preferably includes from about 10 to 70 percent by weight, more preferably about 15 to 50 percent by weight, and most preferably about 20 to 40 percent by weight of the alkyd resin component based on the total weight of the coating system.

In an embodiment, the coating system described herein includes an alkyd resin component derived from the reaction of a feedstock containing at least one resin with a polyester backbone and a feedstock containing waste cooking oil. In an aspect, the feedstock containing at least one resin with a polyester backbone. In an aspect, the polyester is linear or branched, and derived from the reaction of one or more polyacids with one or more polyols. In a preferred aspect, the polyester is a polyalkylene terephthalate.

In a preferred embodiment, the polyester is derived from waste or recycled materials. Accordingly, in an embodiment, the polyester is derived by the reaction of a polyol or diol with a waste or recycled polyacid, including for example, polyalkylene terephthalate. Suitable polyalkyelene terephthalates include, for example, polyethylene terephthalate (PET), polypropylene terephthalate, polybutylene terephthalate, combinations or mixtures thereof, and the like. The amount of terephthalate is in the range of 10 to 90 percent by weight, preferably 20 to 80 percent by weight, more preferably 30 to 50 percent by weight, based on the total weight of the polyester-containing feedstock.

In an embodiment, the polyester backbone of the feedstock is made from recycled polyalkylene terephthalate (PET) reacted with a hydroxyl-functional compound. In an aspect, the recycled PET may post-consumer clear flake PET, post-consumer green flake PET, and combinations thereof. Regardless of grade, post-consumer PET is free of labeling contamination and polypropylene contamination.

In an embodiment, the polyester backbone of the feedstock is made from recycled PET reacted with a hydroxyl-functional compound. In an aspect, the hydroxyl-functional compound is a polyol, or a compound at least two hydroxyl groups (a diol). Examples of suitable hydroxyl-functional compounds include, without limitation, ethylene glycol, diethylene glycol, triethylene glycol, cyclohexanedimethanol, propylene glycol, 1,2-propylene glycol, 1,3-propane diol, 1,2-butylene glycol, 1,3-butanediol, 1,4-butanediol, neopentyl glycol, 1,5-pentanediol, 1,6-hexanediol, glycerol, trimethylolpropane, trimethylolethane, pentaerythritol, erythritol, derivatives thereof, combinations thereof, and the like. In a preferred aspect, the hydroxyl-functional compound is pentaerythritol. The amount of the hydroxyl-functional compound is in the range of about 1 to 10 percent by weight, preferably 2 to 6 percent by weight, based on the total weight of the polyester-containing feedstock.

Without limiting to theory, it is believed that the incorporation of polar groups into the polyester feedstock improves dispersibility of the ultimate alkyd resin in water. Accordingly, in an embodiment, the feedstock including at least one polymer with a polyester backbone also includes a carboxyl-functional compound. In an aspect, the carboxyl-functional compound is a polyacid, preferably a monomer of a polyacid. Suitable polyacids include, for example, polyacids derived from monomers such as trimellitic acid, trimellitic anhydride, maleic acid, maleic anhydride, fumaric acid, isophthalic acid, derivatives thereof, combinations thereof, and the like. In a preferred aspect, the polyacid is derived from trimellitic acid. The amount of carboxyl-functional compound is in the range of about 1 to 20 percent by weight, preferably 5 to 15 percent by weight, based on the total weight of the polyester-containing feedstock.

Without limiting to theory, it is believed that alkyd resins with high crosslink density, and consequently fast dry times, require the use of fast drying oils. Accordingly, in an embodiment, the polyester-containing feedstock includes a small quantity of a fast drying oil, such as, for example, linseed oil, tung oil, and the like. The amount of linseed oil may vary depending on the desired molecular weight of the alkyd resin component, but is preferably about 1 to 10 percent by weight, more preferably 2 to 7 percent by weight, based on the total weight of the polyester-containing feedstock.

In an embodiment, the coating system described herein includes an alkyd resin component derived from the reaction of a polyester-containing feedstock and a feedstock containing triglycerides or fatty acids derived from cooking oil. Conventionally, alkyd resins are produced by the reaction of polyols with fatty acids, including those derived from oils from vegetable sources (e.g., soybean oil, peanut oil, sunflower oil, linseed oil, coconut oil, cottonseed oil, canola oil, corn oil, safflower oil, walnut oil, castor oil, tung oil, and the like) and animal sources (e.g., lard, fish oil, poultry fat, tallow, etc). Typically, alkyds are made from virgin oils (i.e., oils not used to prepare food products) or tall oils. Virgin oils are relatively free of contaminants and have a low concentration of free fatty acids (typically about 1 to 10% free fatty acid (FFA) content). In contrast, waste cooking oil, characterized as yellow grease, brown grease (also known as trap grease, sewage grease or black grease), or combinations of yellow and brown grease, has a much higher free fatty acid concentration. Yellow grease typically has FFA content of between about 4 and 15 percent by weight, while brown grease typically has FFA content of up to about 60 percent by weight. The current supply of yellow and brown grease far exceeds current demand for these feedstocks, and therefore, waste cooking oil represents an inexpensive and easily obtainable feedstock for alkyd production.

Accordingly, the coating system described herein includes an alkyd resin component derived from the reaction of a polyester-containing feedstock and a waste cooking oil feedstock. The waste cooking oil feedstock may be yellow grease, brown grease or some combination thereof. In a preferred aspect, the waste cooking oil feedstock is yellow grease, preferably stabilized with an antioxidant. The waste cooking oil feedstock may be combined or supplemented with virgin vegetable oil and/or other types of non-cooking waste oil. The amount of waste cooking oil feedstock used to make the alkyd resin is about 20 to 40 percent by weight, preferably 25 to 35 percent by weight, based on the total weight of the resin. Given the high degree of contamination in waste cooking oil feedstock, and contrary to industry convention, the contaminated waste cooking oil was surprisingly and unforeseeably found to be a useful feedstock for the preparation of a commercial-grade alkyd resin.

Conventional methods for making alkyd resins are known in the art (see, e.g., U.S. Pat. Nos. 4,133,786, 4,517,322, and 6,946,509). Any suitable reaction process known in the art may be used to make the alkyd resins described herein, using a polyester-containing feedstock and a waste cooking oil feedstock. For example, in an aspect, the polyester-containing feedstock and the waste cooking oil feedstock are combined and heated until an alkyd resin with the desired properties is obtained. In another aspect, waste cooking oil is combined with the hydroxyl-functional compound and heated to produce a mixture of monoglyceride oils for reaction with the polyester-containing feedstock. In yet another aspect, the components of the polyester-containing feedstock are combined and reacted, with the resulting product subsequently reacted with the waste cooking oil feedstock.

In an embodiment, the alkyd resin described herein is made by an ester-interchange reaction, i.e. by transesterification of the waste cooking oil and polyester-containing feedstocks. Conventionally, alkyds are produced using an alcoholysis or glyceride process, involving the reaction of an oil with high unsaturated fatty acid content with a polyol to produce a resin. A diacid or anhydride is then added to build up molecular weight of the resin. A significant amount of water is produced as a condensate byproduct of the reaction, which lowers the reaction rate and resin yield. Typically, the water is removed through additional processing steps such as heating and/or reaction with excess acid or anhydride.

Surprisingly, and contrary to current knowledge and expectations in the art, the alkyd resin described herein is made by an ester-interchange reaction, i.e. by a transesterification reaction using waste cooking oil and post-consumer PET. Moreover, contrary to convention, this reaction does not produce water as a condensate byproduct. As a result, the reaction proceeds at a faster rate and leads to higher resin yields with near-zero byproducts as waste stream.

Conventionally, alkyd resins are softer because the oils used to prepare them act as internal plasticizers and as chain stoppers during reaction. Surprisingly, however, the alkyd resin described herein demonstrates excellent hardness, due to incorporation of PET into the alkyd. Without limiting to theory, it is believed that the incorporation of PET results in higher crosslink density and the presence of PET repeat units between the crosslinks results in hard domains within the alkyd resin backbone, producing a resin with increased overall hardness.

Conventionally, water-reducible alkyds suffer from poor water resistance, especially relative to solvent-borne alkyds. Without limiting to theory, this is believed to be because the acid or ester groups in the alkyd backbone are easily hydrolyzed and the composition loses stability. Surprisingly, the water-reducible alkyd described herein, with PET groups incorporated into the alkyd backbone, has near-immediate water resistance on application to a metal substrate.

In an embodiment, the coating composition described herein includes a water-reducible alkyd resin in admixture with in a fluid carrier. In an aspect, the carrier is an aqueous carrier, a non-aqueous carrier, or an aqueous carrier in combination or admixture with a non-aqueous carrier. In an aspect, the carrier is present at preferably about 10 to 60 wt %, more preferably 20 to 50 wt %, and most preferably about 25 to 45 wt %, based on the total weight of the composition.

In addition to water, the fluid carrier of the coating composition optionally may include one or more additional co-carriers. Co-carrier(s) may be used for a variety of purposes, including helping in film formation and/or paint stability. Examples of suitable co-carriers include butyl cellosolve, alcohol(s), such as butanol, coalescing agents (e.g., ester alcohol(s), such as the Eastman Texanol product and/or low VOC coalescents such as those described in U.S. Pat. Nos. 6,762,230 and 7,812,079), glycol ether(s), combinations of these, and the like. Desirably, so-called VOC-exempt co-carrier(s) are preferred.

A wide variety of other additional ingredients optionally may be included in the coating composition if desired. For example, where the coating system described herein is to be included in a paint formulation, other optional ingredients may be added. These include, without limitation, one or more fillers, pigments, defoaming aids, grinding aids, wetting agents, surfactants, coalescing aids, processing aids, skid resistance agents, abrasion resistance agents, conductive agents, antistatic agents, coloring agents, anticorrosion aids, thickeners, sag resistant agents, plasticizers, antioxidants, ultraviolet stabilizers, biocides, fungicides, fillers, combinations of these, and the like. These can be used in accordance with conventional practices currently known or hereafter developed.

The water-reducible coating composition described herein can be made using a variety of techniques known to those of skill in the art.

The composition described herein can be used to coat a wide variety of substrates. Exemplary substrates include natural and building materials, trucks, railcars, freight containers, flooring materials, walls, furniture, other building materials, motor vehicle components, aircraft components, marine components, machinery components, laminates, equipment components, appliances, packaging, and the like. Exemplary substrate materials include metals, metal alloys, intermetallic compositions, metal-containing composites, combinations of these, and the like. The coating compositions can be applied on new substrates or can be used to refurbish old substrates.

In an embodiment, the composition described herein is used to coat metal substrates, including the underbody of a wide variety of storage units, transportations vehicles and the like. For example, the composition described herein may be used to partially or fully coat the underbody of an intermodal cargo container or shipping container.

The coating compositions of the invention may be applied to substrates in a variety of ways. According to one illustrative mode of practice, a substrate to be coated is provided. The substrate may be bare or may be at least partially coated with a previous coating system. In an aspect, the previous coating system is preferably a waterbased coating composition, including a corrosion-resistant primer composition. For example, when the coating composition described herein is used to coat the underbody of a container, the previous coating system preferably includes a first resin component in admixture with an aqueous carrier, and one or more fillers. Suitable compositions of this type include, for example, the waterbased primer composition described in PCT/US2011/057040, filed 20 Oct. 2011. As described, the waterbased primer composition can be applied over other coating compositions, including over Zn-containing shop primers, Zn-rich epoxy-based shop primers, and the like.

It may be desirable to clean the substrate to remove grease, dirt, and other contaminants. Pre-existing coatings may or may not be removed as well, depending upon the context. When the substrate is ready, the coating composition described herein is applied to at least a portion of the substrate surface and allowed to dry. One or more additional coats of the coating composition can be applied if desired. Often, a single coating is suitable.

The coating composition described herein may be used to make formulations or paints that can be applied at a wide range of thicknesses. Typically and preferably, the coating is applied at a medium thickness or film build. In illustrative embodiments, the coatings have a wet film thickness in the range preferably from about 200 micrometers to about 400 micrometers, more preferably about 250 micrometers to about 350 micrometers, corresponding to a dry film thickness of preferably about 100 to 200 micrometers, more preferably about 125 to 175 micrometers.

The coating composition described herein is particularly suitable for forming protective coatings on the underbody of transport vehicles and storage units used in transport, including cargo or shipping containers, for example. Such vehicles and storage units, and especially the underbody components of such vehicles and units, are often exposed to extreme environments in terms of weather exposure, salt water exposure, fresh water exposure, heat from the sun, and the like during their service lives. Moreover, the corrosion of underbody components is accelerated by significant exposure to dirt, chemicals, mud, sand and other residue during transport or storage. Therefore, protection of underbody components against abrasion, corrosion, and the like is needed.

The coating composition described herein can be applied to a substrate or article by conventional methods known to those of skill in the art. Suitable methods include, without limitation, brushing, spraying, spin coating, roll coating, curtain coating, dipping, gravure coating, and/or the like.

A cured or dried coating formed from the composition described herein shows excellent adhesion to both primed and unprimed metal surfaces. Thus, the present invention is particularly advantageous for forming protective coatings, including underbody coating, for example, without the need for an intermediate protective layer or primer layer on the metal surface. The fact that the present invention achieves this adhesion with a water-reducible composition that has near-immediate water resistance is particularly advantageous and unexpected.

The present invention will now be described with reference to the following illustrative examples.

EXAMPLES

Test Methods

In some embodiments, the coating system described herein provides excellent corrosion resistance when applied to a metal substrate, either directly or over a previous coating applied to the substrate. Corrosion resistance and other properties can be tested in various ways. Unless otherwise indicated, the following tests were used in the Examples that follow.

Salt Spray Test

Salt spray testing is a standardized method to determine corrosion resistance of coatings applied to metal substrates. The test is conducted in a salt spray cabinet, where a salted solution (typically 5% NaCl) is atomized and sprayed on the surface of a test panel to which a coating composition has been applied and a scribe has been made. The panel is maintained in a salt fog over a fixed period of time to duplicate a highly corrosive environment. Corrosion resistance is determined by measuring creep from scribe, and by assessing blister formation. Test parameters are used according to ASTM B117 (Standard Practice for Operating Salt Fog Apparatus).

Cyclic Corrosion Test

Cyclic corrosion testing is used to determine corrosion resistance of coating applied to metal substrates, and is intended to duplicate natural exposure to a corrosive and/or humid environment. Test panels with the applied coating are scribed and then exposed to a humid environment for about 6 hours at 50° C. and 100% relative humidity. The panels are then dipped or sprayed with a salt solution (typically 5% NaCl) at room temperature for about 15 minutes. The panels are then dried for several hours at 60° C. at 50% relative humidity. The process is repeated for several cycles over a fixed period of time, and corrosion resistance is determined by measuring creep from scribe, and by assessing blister formation. Test parameters are used according to SAE J2334 (Laboratory Cyclic Corrosion Testing).

Crosshatch Adhesion Test

Adhesion testing is used to determine the resistance of a coating to delamination and failure when exposed to a corrosive environment. Test panels are coated to a thickness of about 5 mil. A crosshatch pattern is made on each test panel, and tape is then applied to the crosshatch. When the tape is pulled off, any coating removed from the crosshatch area is indicative of adhesion, rated on a scale of 0 to 5. Test parameters are as provided in ASTM D3359 (Method B; Standard Test Method for Measuring Adhesion by Tape Test).

Chip Resistance

This test is used to evaluate the surface resistance of a coating to chipping caused by impact from gravel, flying debris, and the like. Test panels with the coating are mounted in a gravelometer and air pressure is used to project gravel of a particular size onto the test sample. The test samples are then cleaned and tape is attached to the surface. Removal of the tape results in removal of any loose fragments chipped away by the impact of gravel. Test panels are then visually compared to standard panels and chip ratings are assigned. Test parameters are provided in ASTM D3170 (Standard Test Method for Chipping Resistance of Coatings)

Example 1

Preparation of Alkyd Resin 546 g of soybean oil, 97 g linseed oil, 71 g pentaerythritol and 0.5 g of dibutyl tin oxide were charged to a 5 L flask equipped with an agitator, condenser, thermometer and inert gas inlet. The reactor was flushed with inert gas and heated to 232° C. 210 g of post-consumer clear PET was added to the reactor over a 5 minute period, followed by the addition of 1 g titanium (IV) butoxide. The reaction temperature was raised 243° C. and held for one hour until the reaction mixture was clear. An additional 200 g of post-consumer PET (clear flake) was added to the reactor over five minutes and held for 45 minutes. Once the reaction mixture was clear, the final charge of 210 g of post-consumer PET was added to the reactor over five minutes and held for three hours. The reaction was then cooled to 175° C. and 163 g of trimellitic anhydride was added to the reactor. The reaction was held until an acid value of 63 was obtained. The temperature was then lowered to 175° C. and 500 g of butyl cellosolve was added. The product was filtered through a paper filter to remove the insoluble material. The final acid number of the resulting alkyd product was 60.0. The final viscosity of the alkyd product measured as a 75.0 wt % solution of the alkyd product in butyl cellosolve solvent was Z5 on the Gardner-Holt scale. The color of the 75.0 wt % solution of the alkyd product as measured on a Gardner color scale was 8 and the solution exhibited some haze.

Example 2

Preparation of Alkyd Resin

The alkyd resin was prepared as described in Example 1, except that the soybean oil is replaced by an equivalent amount of yellow grease on a gram for gram basis, and post-consumer clear flake PET was replaced by post-consumer green flake PET. The final acid number of the resulting alkyd product was 61.2. The final viscosity of the alkyd product measured as a 75.0 wt % solution of the alkyd product in butyl cellosolve solvent was Z4 ½ on the Gardner-Holt scale. The color of the 75.0 wt % solution of the alkyd product was dark green and the solution exhibited some haze.

Example 3

Performance Testing

Coating compositions prepared as in Example 1 and Example 2 were applied to directly to test panels made of either cold rolled steel or hot rolled steel blasted to a profile depth of about 1.5 mil. The coating compositions are applied at film thicknesses of 5 mil (approx. 125 µm; for adhesion testing) or 6 mil (approx. 150 µm; for corrosion testing). The coated panels are then cured by baking to a temperature of about 120° F. The test panels are subjected to various performance tests for corrosion resistance, durability and adhesion. Results are shown in Tables 1 to 3.

TABLE 1

Accelerated Corrosion Testing

| | Accelerated Corrosion Testing (4 days post-cure @ 120 F.) | Example 1 | Example 2 |
|---|---|---|---|
| Salt Fog | Time to blister formation | 336 Hours | 500 Hours |
| | Creep From Scribe | 1 mm | 1 mm |
| | Field Blistering | none | very few, #4 size |

| | Accelerated Corrosion Testing | Example 1 | | Example 2 | |
|---|---|---|---|---|---|
| | No. of cycles | 20 | 40 | 20 | 40 |
| SAE J2334 | Creep From Scribe | 1 mm | | 1 mm | |
| | Field Blistering | none | | none | |

TABLE 2

Durability Testing (Gravelometer)

| Composition | 1 day | 1 week | 2 weeks |
|---|---|---|---|
| Example 1 | 3B | 5A | 7A |
| Example 2 | 3B | 5B | 3C |

TABLE 3

Adhesion Testing

| Crosshatch Adhesion | Time | | |
|---|---|---|---|
| | 1 day | 1 week | 2 weeks |
| Crosshatch - Smooth Cold Rolled Steel (Example 1) | 1B | 3B | 4B |
| Crosshatch - Smooth Cold Rolled Steel (Example 2) | 1B | 3B | 4B |
| Crosshatch - 1.5 mil profile blasted hot rolled steel (Example 1) | 2B | 4B | 5B |
| Crosshatch - 1.5 mil profile blasted hot rolled steel (Example 2) | 2B | 4B | 5B |

The embodiments of the present invention described above are not intended to be exhaustive or to limit the invention to the precise forms disclosed in the following detailed description. Rather the embodiments are chosen and described so that others skilled in the art may appreciate and understand the principles and practices of the present invention. All patents, pending patent applications, published patent applications, and technical articles cited herein are incorporated herein by reference in their respective entireties for all purposes.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A coated article, comprising;
    at least a portion of an exposed surface of a metal substrate; and
    a coating system applied to at least the exposed surface, wherein the coating system comprises:
        a water-reducible alkyd resin comprising the reaction product of
            about 65 to 75 wt % of a polyester feedstock comprising
                about 20 to 80% by weight of polyethylene terephthalate;
                about 1 to 10% by weight of a hydroxyl-functional compound; and
                about 1 to 20% by weight of a carboxyl-functional compound, based on the total weight of the polyester feedstock; and
            about 25 to 35 wt % of a waste cooking oil feedstock comprising yellow grease, brown grease, or mixtures thereof.

2. The article of claim 1, wherein the polyethylene terephthalate is derived from post-consumer waste material.

3. The article of claim 1, wherein the hydroxy-functional compound is selected from ethylene glycol, diethylene glycol, triethylene glycol, cyclohexanedimethanol, propylene glycol, 1,2-propylene glycol, 1,3-propane diol, 1,2-butylene glycol, 1,3-butanediol, 1,4-butanediol, neopentyl glycol, 1,5-pentanediol, 1,6-hexanediol, glycerol, trimethylolpropane, trimethylolethane, pentaerythritol, erythritol, derivatives thereof, or combinations thereof.

4. The article of claim 1, wherein the carboxyl-functional compound is selected from trimellitic acid, trimellitic anhydride, maleic acid, maleic anhydride, fumaric acid, isophthalic acid, and combinations thereof.

5. The article of claim 1, wherein the hydroxy-functional compound is pentaerythritol.

6. The article of claim 1, wherein the carboxyl-functional compound is trimellitic acid.

7. The article of claim 1, wherein the metal substrate comprises at least a part of an underbody of a transportation vehicle or storage unit.

8. The article of claim 1, wherein the metal substrate comprises at least a portion of an underbody of an intermodal shipping container.

9. The article of claim 1, wherein the metal substrate is an intermodal shipping container.

10. The article of claim 1, wherein the polyester feedstock further includes about 1 to 10 wt % linseed oil.

11. The article of claim 1, wherein the alkyd resin composition has an acid number of about 40 to about 70.

12. The article of claim 1, wherein the alkyd resin composition has a molecular weight (Mn) of 1000 to 10,000.

* * * * *